(12) United States Patent
Yanagita

(10) Patent No.: US 7,575,390 B2
(45) Date of Patent: Aug. 18, 2009

(54) COUPLING DEVICE FOR A DAMPER

(75) Inventor: Yousuke Yanagita, Utsunomiya (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 321 days.

(21) Appl. No.: 11/235,111

(22) Filed: Sep. 27, 2005

(65) Prior Publication Data

US 2006/0072965 A1 Apr. 6, 2006

(30) Foreign Application Priority Data

Sep. 27, 2004 (JP) .............................. 2004-279023

(51) Int. Cl.
*B25G 3/18* (2006.01)
*F16B 21/00* (2006.01)
*F16D 1/00* (2006.01)
*B25G 3/00* (2006.01)

(52) U.S. Cl. ..................... 403/329; 403/360; 411/522; 24/297

(58) Field of Classification Search .................. 403/123, 403/144, 252, 331, 360, 353, 329, 220; 411/53, 411/508, 509, 913, 512, 522, 41, 45–51; 24/453, 297, 702

See application file for complete search history.

(56) References Cited

U.S. PATENT DOCUMENTS 3,411,815 A * 11/1968 Sullivan, Jr. ............... 403/138
4,762,437 A * 8/1988 Mitomi ....................... 403/11
5,165,833 A * 11/1992 Watanabe et al. ........... 411/508
5,322,402 A * 6/1994 Inoue ......................... 411/510
5,507,610 A * 4/1996 Benedetti et al. ........... 411/339
5,704,753 A * 1/1998 Ueno ......................... 411/509
6,463,774 B2 * 10/2002 Sokurenko ................... 70/360
7,073,230 B2 * 7/2006 Boville ....................... 24/297
7,178,206 B2 * 2/2007 Kuhnle et al. ................ 24/297
7,243,401 B2 * 7/2007 Sawatani ..................... 24/297

FOREIGN PATENT DOCUMENTS

JP          2001-323721        11/2001
JP          2002-106245         4/2002

* cited by examiner

*Primary Examiner*—Daniel P Stodola
*Assistant Examiner*—Nahid Amiri
(74) *Attorney, Agent, or Firm*—Manabu Kanesaka

(57) ABSTRACT

A coupling device for a piston rod type damper used to open and close a movable body on a main body is interposed between the main body and the movable body, and has a part of the damper attached so as to be capable of rotation. The device includes a clip having a shaft part with an encircling groove projecting on the upper side of a flange part, a locking leg projecting on the lower side of the flange part, and a cap capable of coupling with the encircling groove. The locking leg is locked in an attachment hole provided on a movable body or main body, and the shaft part is inserted through a shaft hole provided in the damper to prevent the shaft part from slipping out of the cap. The device provides both excellent coupling operability and reliability, and desirable external appearance characteristics.

7 Claims, 8 Drawing Sheets

COUPLING DEVICE FOR A DAMPER

BACKGROUND OF THE INVENTION AND RELATED ART STATEMENT

The present invention relates to a coupling device, particularly for a piston rod type damper.

In the case when switching a comparatively heavy movable body to rotate between an open position and a closed position, by interposing a piston rod type (for example, constituted such that a piston rod is slid against a cylinder as in an air damper) damper between the main body and the movable body, it is handled such that the movable body is not rotated suddenly toward the direction of the open position by unlocking of the rod means.

FIG. 8 shows the structure disclosed in Patent Document 1 as one example thereof. In FIG. 8, symbol 50 is an instrument panel as a main body, symbol 55 is a glove compartment as a movable body, and symbol 60 is an air damper which has a cylinder 61 and a piston rod 62. Here, the glove compartment 55 is supported to be capable of being switched to rotate between an open position and a closed position on a corresponding placement part of the instrument panel 50, and also it is locked in the closed position by a locking means not illustrated. The air damper 60 is coupled with the cylinder 61 which is attached to the instrument panel 50 and the piston rod 62 which is attached to the glove compartment 55, respectively to be capable of rotation. In this structure, it is made possible to attach or couple without using a screw or shaft member as required in the past. That is, the cylinder 61 has a contracted diameter part 61a which is provided on the front end side and shaft parts 63 which are provided on both sides of the contracted diameter part 61a. Also, the cylinder 61 is coupled to be capable of rotation, in a state having the contracted diameter part 61a placed between sides of a raised wall 51 which are provided on the instrument panel 50, by having the shaft parts 63 on both sides fitted into bearing hole parts 51a on the sides of the corresponding raised parts.

As opposed to this, the piston rod 62 has a fitting hole 64 which is provided on the projecting end. Also, the piston rod 62 is coupled to be capable of rotation by being inserted through the outside part of the glove compartment 55 from between sides of the raised wall 51, and fitting together the fitting hole 64 on the projecting end and a fitting projection 56 which is placed to project on the outside surface of the glove compartment 55.

Patent Document 1: Japanese Unexamined Patent Publication No. 2002-106245

Although a coupling structure as mentioned above is simple, it has problems from viewpoints such as the following.

(a) This kind of damper also may be placed inside the glove compartment due to vehicle body design. By such specification, the structure in FIG. 8 cannot be adopted, and in addition, if it is coupled by being attached using a screw or shaft member as in the past, the external appearance is degraded and the attractiveness is difficult to maintain.

(b) It is preferable that this kind of damper be jointly usable for various purposes, and from that viewpoint, instead of the contracted diameter part and the shaft parts of the cylinder as in FIG. 8, one would like to make them as shaft holes to be commonly used as coupling parts for both the cylinder and the piston rod, so that they can be coupled easily and quickly using those shaft holes.

(c) The piston rod is coupled to the glove compartment by fitting together the fitting hole and the fitting projection. However, in this structure, because the glove compartment is comparatively large and some extent of play is set in the part of placement on the instrument panel side, for example, if the glove compartment is subject to a great load in the lateral direction, there is a risk that the fitting projection may come out from the fitting hole. Also, the cylinder is supported by being coupled to the instrument panel by fitting together the shaft parts and the bearing hole parts. However, in this structure, when the cylinder is subject to a load in the left-right direction in FIG. 8 by means of the piston rod, there is a risk that the raised walls may be displaced and the shaft parts may come out from the bearing hole parts. One would like to eliminate the above instability factor.

The purpose of the present invention is to eliminate problems such as those described above with structural simplicity, and to provide a coupling device having excellent coupling operability and external appearance characteristics during use, and moreover, it does not come off unexpectedly, while maintaining a simple shaft hole structure as a damper side coupling part.

Further objects and advantages of the invention will be apparent from the following description of the invention.

SUMMARY OF THE INVENTION

In order to achieve the above-mentioned purpose, in a first aspect, the present invention is directed to a damping piston rod type damper which is used when switching a movable body to rotate between an open position and a closed position on a main body and is interposed between said main body and movable body, and having a corresponding part of that damper attached to be capable of rotation on said movable body or said main body. The damper comprises a clip, which has a shaft part with an encircling groove which is placed projecting on the upper side of the flange part and a locking leg which is placed projecting on the lower side of said flange part, and a cap which is capable of coupling with said encircling groove. The locking leg is locked in an attachment hole which is provided on said movable body or main body, and also said shaft part is inserted through a shaft hole which is provided on said damper side, and is prevented from slipping out by said cap which is coupled to the encircling groove of said shaft part.

In the above-described structure, the piston rod type damper has a cylinder and a piston rod. Also, the coupling device can be used in the case when the piston rod is coupled to be capable of rotation in an attachment hole provided on the movable body (or the main body) and the cylinder is coupled to be capable of rotation in an attachment hole provided on the main body (or the movable body) as in the embodiment.

In the present invention described above, it is more preferable that said cap has a coupling part for coupling with said encircling groove formed on the inside, and has a shape that covers said shaft part and shaft hole to be nearly unobservable when in a state being installed on said shaft part by means of the coupling between said encircling groove and coupling part (second aspect); that the piston rod or cylinder constituting said damper and having said shaft hole formed is restricted in its range of rotation to a prescribed angle by a contact projection which is provided on said shaft part and a cut-out part which is formed on said shaft hole and allows said contact projection to slip by (third aspect); and that said shaft part has a vertical rib which is made capable of linear contact with the inner perimeter surface of said shaft hole (fourth aspect).

In the invention of the first aspect, for example, even with a specification in which the damper is placed inside the movable body, the external appearance characteristics can be maintained by the fact that the cap functions as a cover to cover the coupling part in the in-use state. Also, because it is sufficient if only a shaft hole which is commonly used as a coupling structure is formed, general usability of the damper can be maintained. The clip can provide necessary and sufficient attachment strength to the attachment hole by the coupling structure between the attachment hole and the locking leg, and can easily satisfy the necessary and sufficient slip prevention strength for the shaft hole by the coupling structure between the encircling groove of the shaft part and the cap.

In the invention of the second aspect, the above-mentioned external appearance characteristics can be improved more assuredly by the cap shape.

In the invention of the third aspect, the range of rotation can be restricted easily by a simple structure without requiring custom members in the case when setting the range of rotation on the damper side.

In the invention of fourth aspect, the frictional resistance of the damper side shaft hole on the shaft part is reduced so that it can rotate well.

DETAILED DESCRIPTION OF THE PREFERRED EMBODIMENTS

Figure 1A:
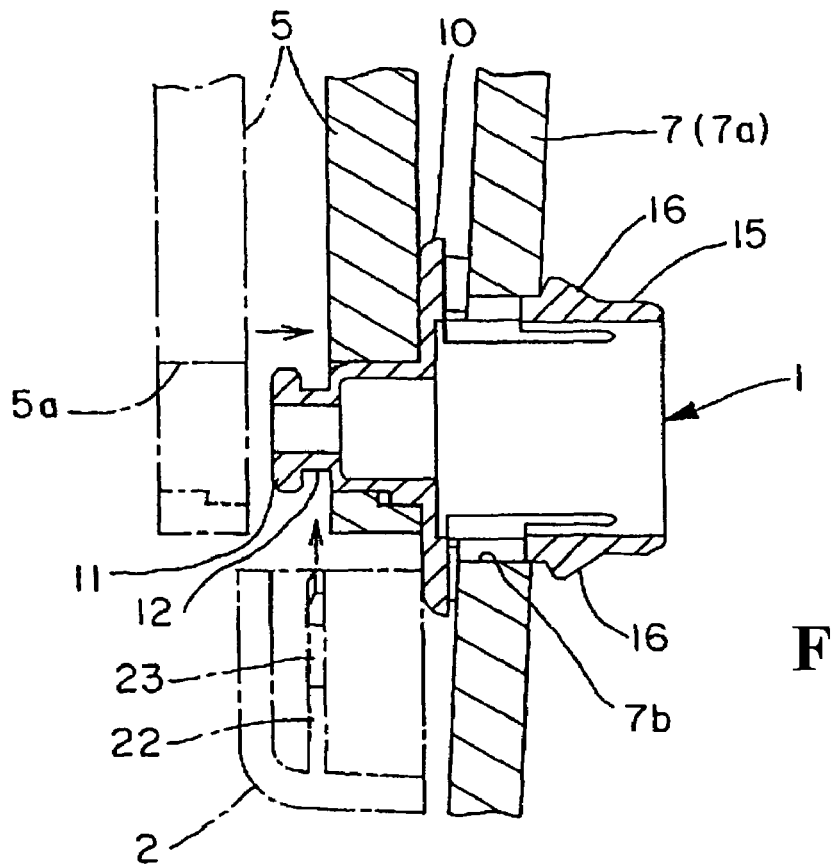
FIGS. 1(a) and 1(b) are typical sectional views of the essential parts showing the coupling operation using the coupling device of the embodiment.
Figure 1B:
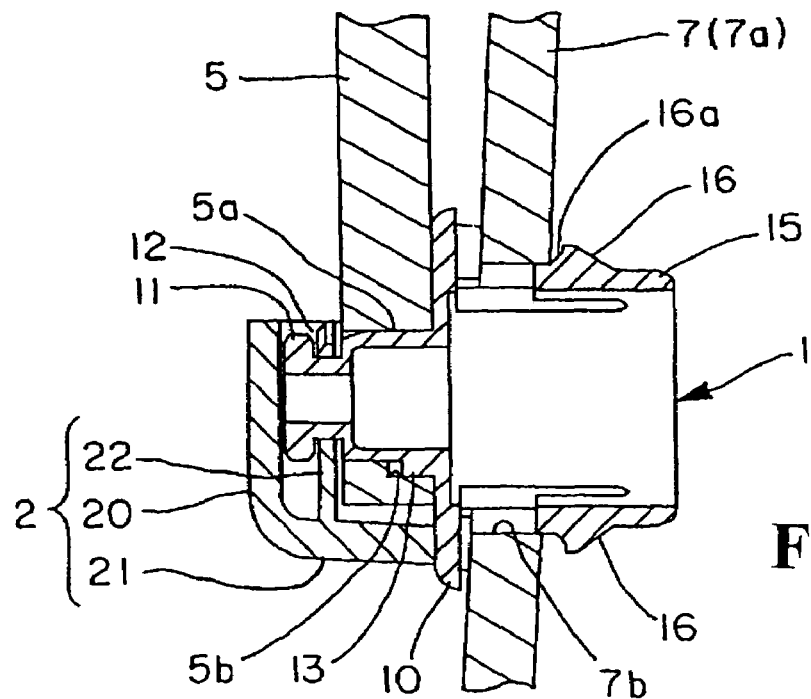
Figure 2A:
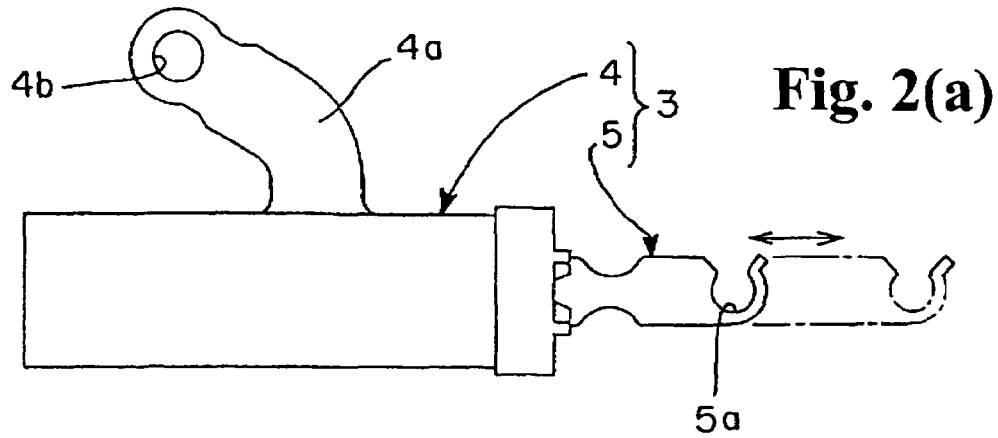
FIGS. 2(a)-2(c) are structural drawings showing one example of a piston rod type damper.
Figure 2B:
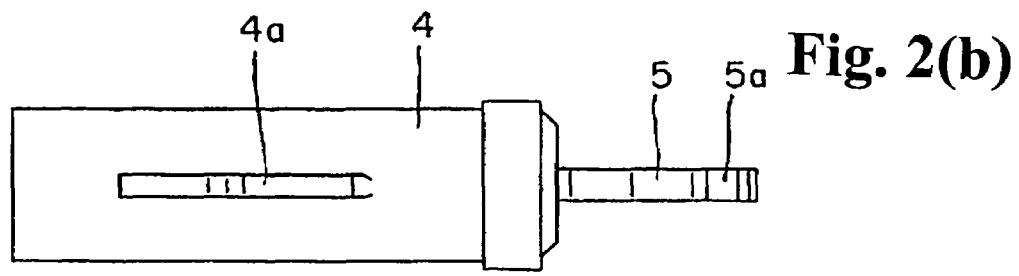
Figure 2C:
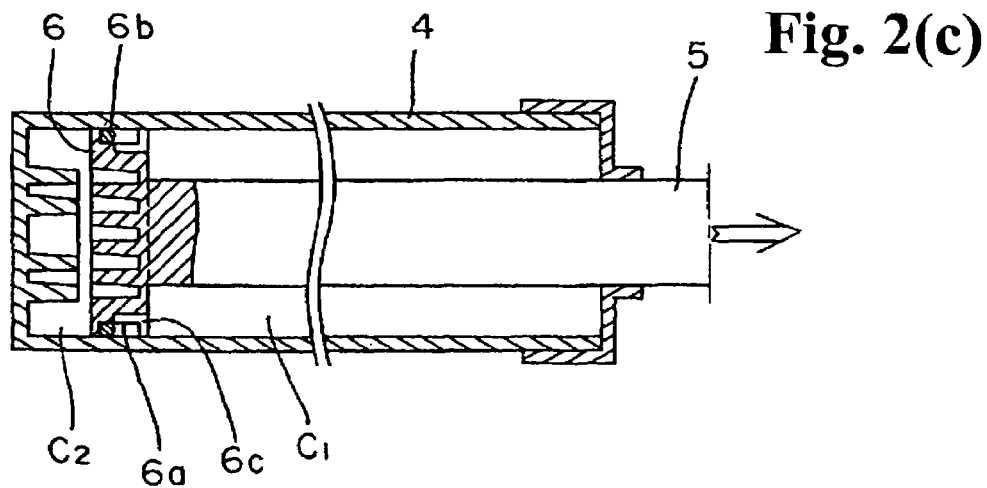
Figure 3:
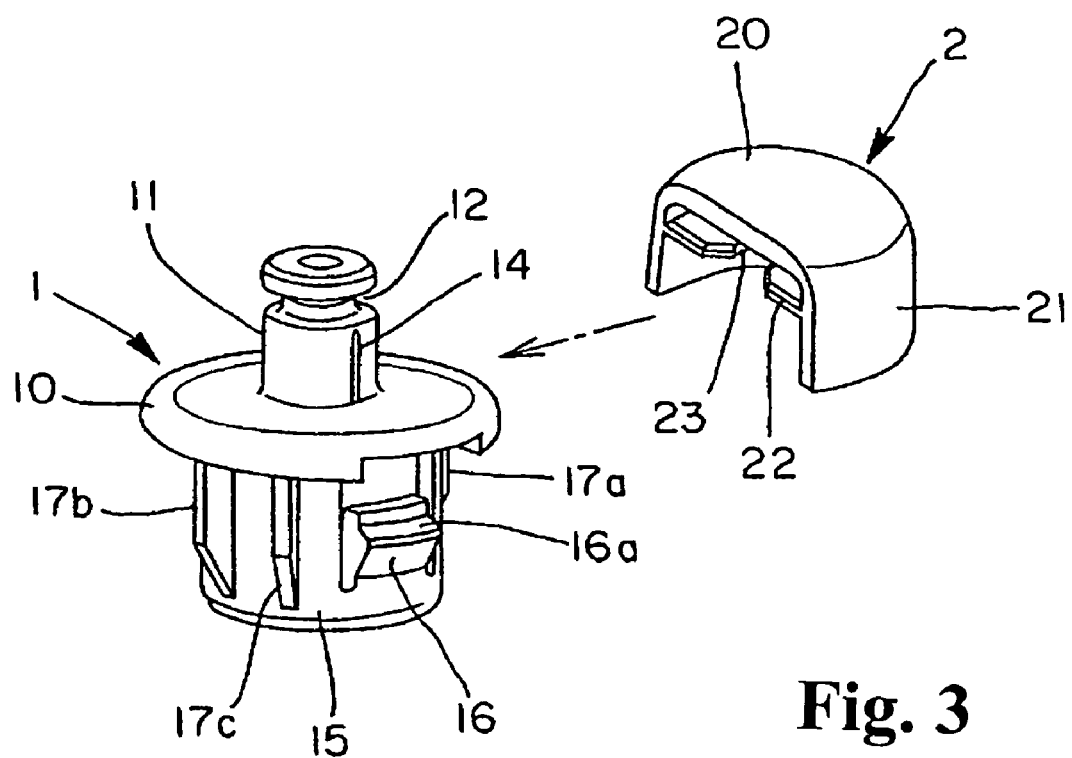
FIG. 3 is an exterior view showing the clip and the cap constituting the above-described coupling device.
Figure 4A:
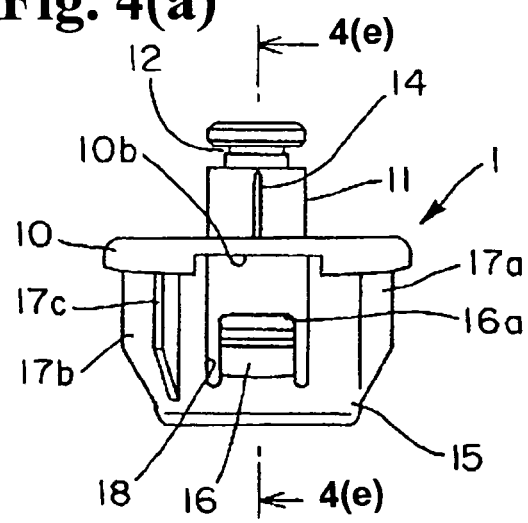
FIGS. 4(a)-4(f) are drawings showing the above-described clip unit and the attachment hole.
Figure 4B:
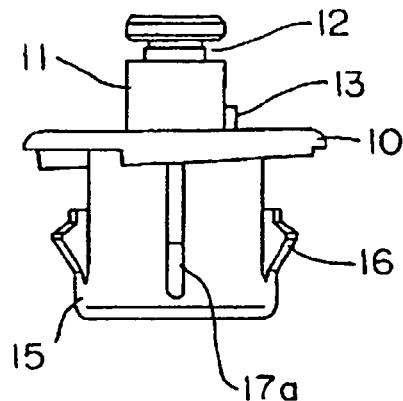
Figure 4C:
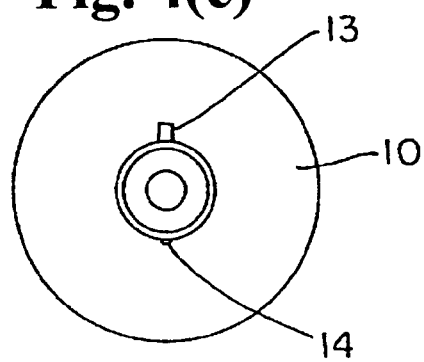
Figure 4D:
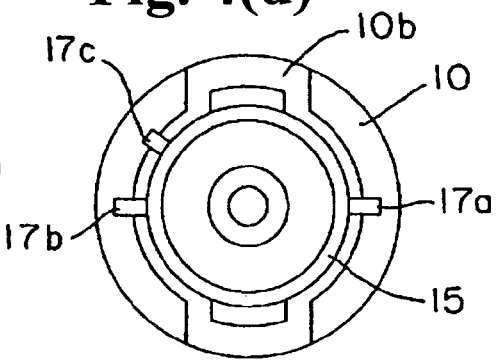
Figure 4E:
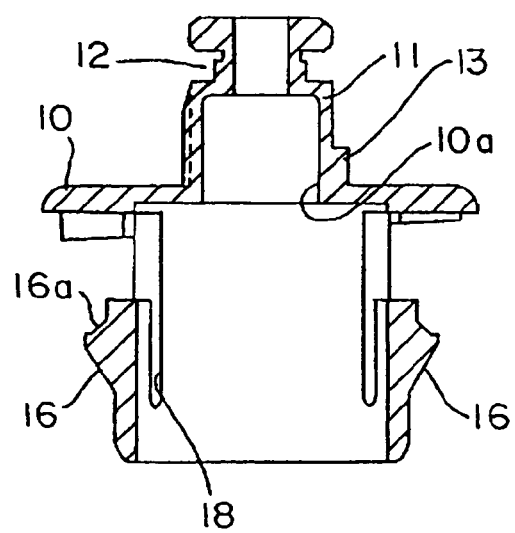
Figure 4F:
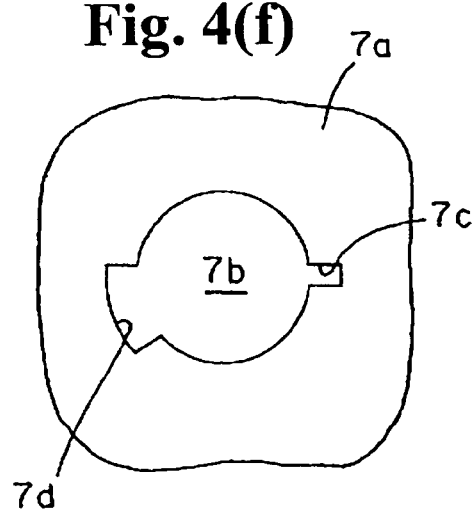
Figure 5A:
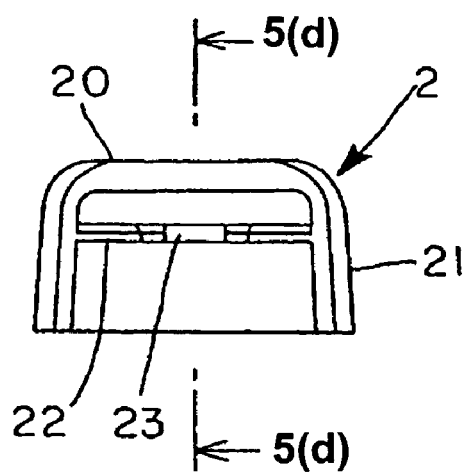
FIGS. 5(a)-5(d) are drawings showing the above-described clip unit.
Figure 5B:
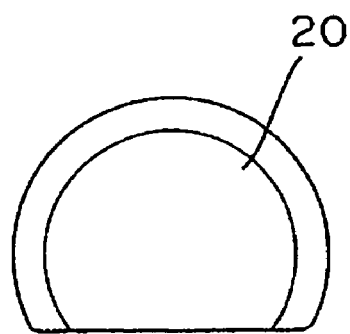
Figure 5C:
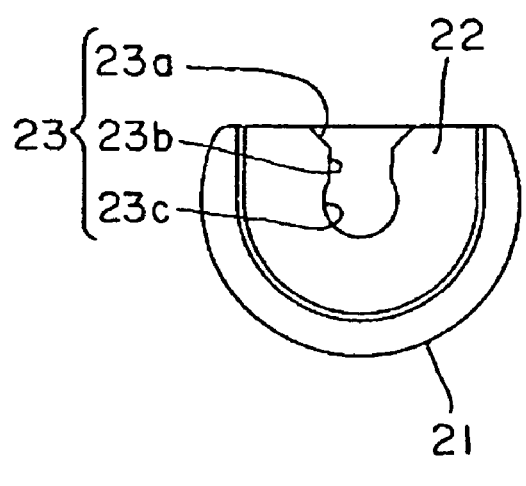
Figure 5D:
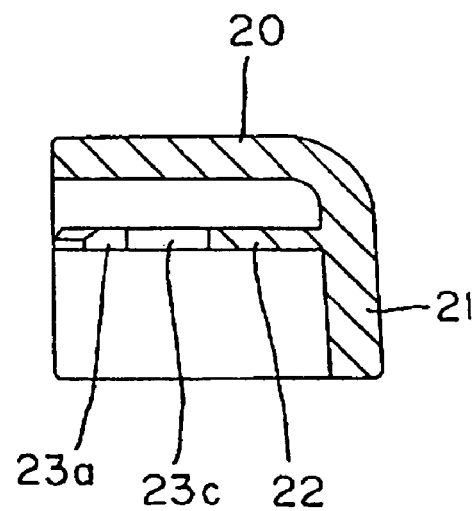
Figure 6A:
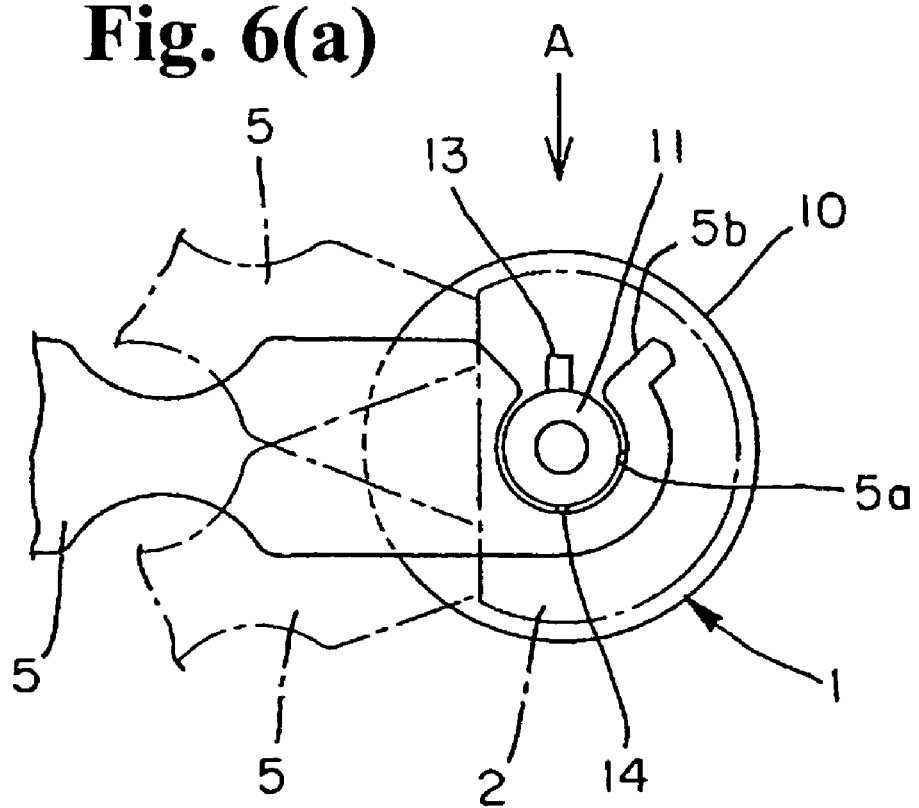
FIGS. 6(a) and 6(b) are operational drawings of the essential parts showing the main operation of the above-described coupling device.
Figure 6B:
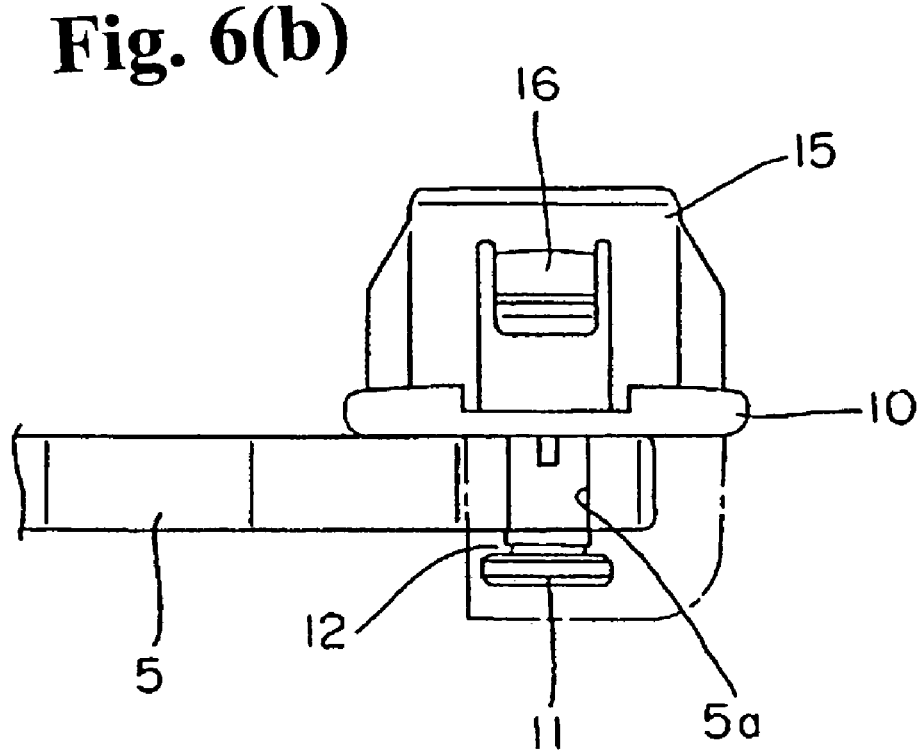
Figure 7:
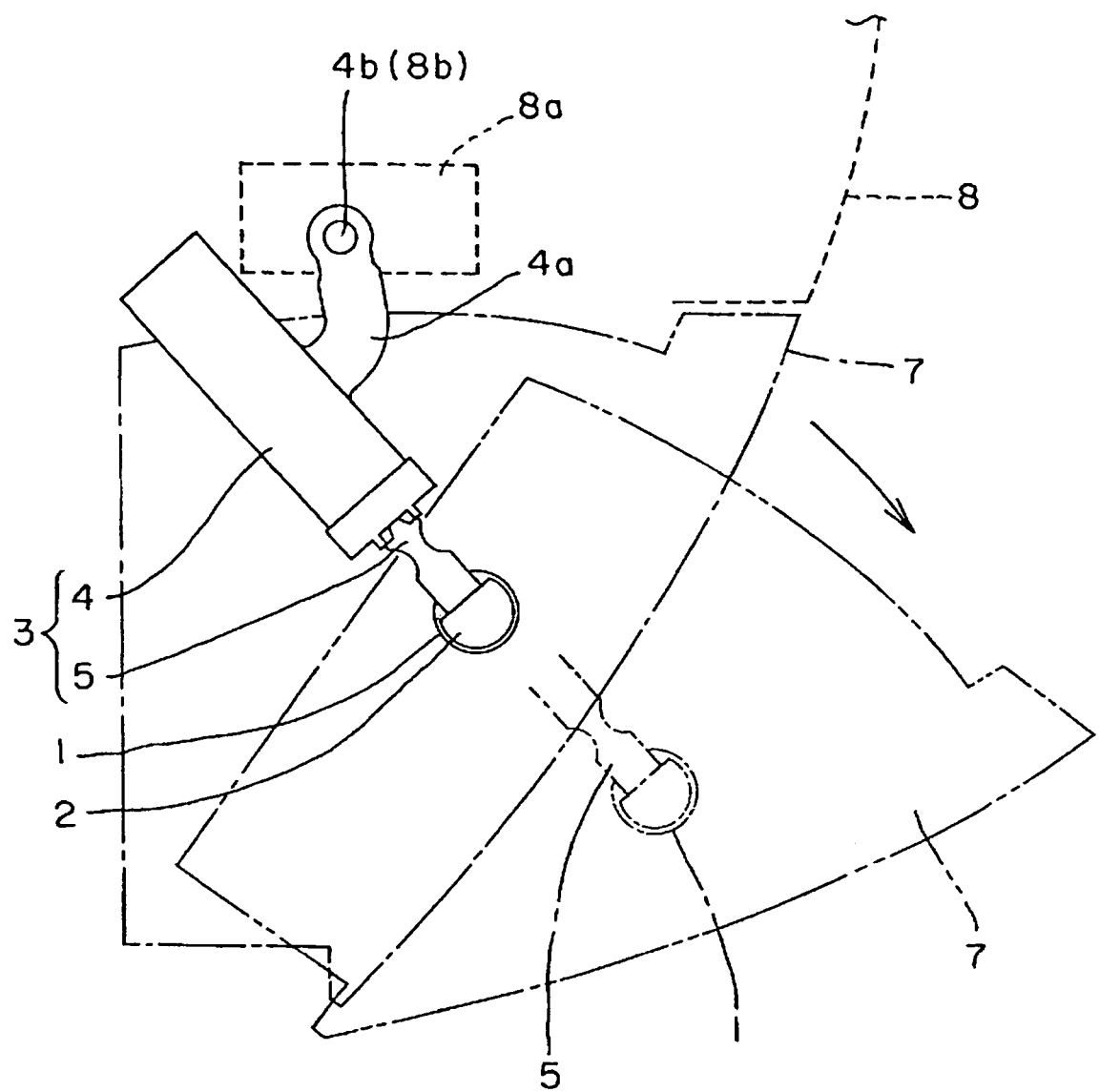
FIG. 7 is a drawing showing a typical operation of the above-described coupling device.
Figure 8:
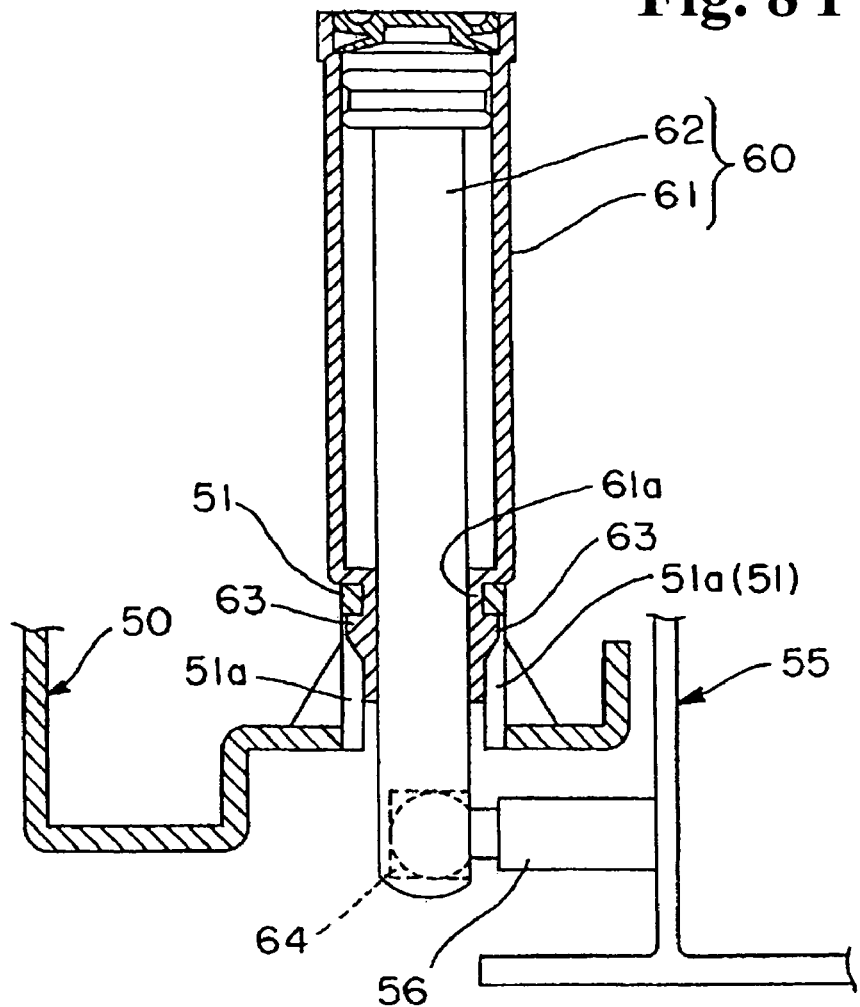
FIG. 8 is a reference drawing for explaining problems associated with conventional coupling devices.

A preferred embodiment of the present invention is explained while referring to the drawings. FIG. 1(a) shows the operational procedure of coupling the damper to the movable body with the coupling device, and FIG. 1(b) shows the coupled state. FIGS. 2(a)-(c) show the damper, wherein FIG. 2(a) is a side view, FIG. 2(b) is a top view, and FIG. 2(c) is an enlarged sectional view. FIG. 3 is an exterior view showing the clip and the cap constituting the coupling device. FIGS. 4(a)-4(e) show the detailed parts of the clip, wherein FIG. 4(a) is a front view, FIG. 4(b) is a side view, FIG. 4(c) is a top view, FIG. 4(d) is a bottom view, FIG. 4(e) is an enlarged sectional view along 4(e)-4(e) line in FIG. 4(a), and FIG. 4(f) shows the attachment hole on the movable body side. FIGS. 5(a)-5(d) show the detailed parts of the cap, wherein FIG. 5(a) is a front view, FIG. 5(b) is a top view, FIG. 5(c) is a bottom view, and FIG. 5(d) is an enlarged sectional view along 5(d)-5(d) line in FIG. 5(a). FIGS. 6(a) and 6(b) show the relationship between the damper and the clip, wherein FIG. 6(a) is a drawing of the clip viewed from above the flange part, and FIG. 6(b) is a drawing viewed from the direction of the A arrow in FIG. 6(a). FIG. 7 is a drawing showing a typical example of use of the coupling device. In the description below, the invention is explained in the order of device structure, coupling operation, and operation.

With regard to device structure, the coupling device of the embodiment comprises a clip 1 made of resin and a cap 2 made of resin, and as shown as an example in FIG. 7, it is used when a piston rod type damper 3 (having a cylinder 4 and a piston rod 5) is attached to a glove compartment 7 as a movable body, which is built into an instrument panel 8 to be capable of being switched to rotate between an open position and a closed position. In FIG. 7, for the sake of convenience, the instrument panel 8 and a support body 8a are indicated by dashed lines, and the glove compartment 7 is indicated by single-dotted lines (closed position) and double-dotted lines (open position).

The clip 1, as shown in FIG. 3 and FIGS. 4(a)-4(f), has a flange part 10 which is provided in about the middle from top to bottom, a shaft part 11 with an encircling groove 12 which is placed projecting on the upper side of the flange part 10, and a locking leg 15 which is placed projecting on the lower side of the flange part 10. Among these, the flange part 10 has roughly a disk shape, and the thickness is different from left to right or front to back, with one side being formed thicker than the other side. A hole 10a is formed in the center, and that hole connects through to the inside of the cylinder of the shaft part 11.

On the lower side, a groove 10b is provided in the front to back direction so as to cross the hole 10a. The shaft part 11 is provided with the total size being larger than a shaft hole 5a (the length of that hole) of the piston rod 5 to be described later, the encircling groove 12 is formed on the front side, a contact projection 13 is placed projecting on the base end side on the perimeter of the shaft, and a vertical rib 14 is provided in a position displaced about 180 degrees from the contact projection 13. The encircling groove 12, as shown in FIG. 1(a), is provided at a height position where it just comes out from the shaft hole 5a of the piston rod 5 when in a state having the shaft part 11 inserted through the shaft hole 5a. The contact projection 13 is a small projecting part, and it is provided in a state being connected to the upper side of the flange part 10. The vertical rib 14 is made capable of linear contact with the inner perimeter surface of the shaft hole 5a in a state having the shaft part 11 inserted through the shaft hole 5a. The inside of the cylinder of the shaft part 11 is formed to a smaller diameter on the front end side.

Also, the locking leg 15 has a pair of elastic claws 16 and rotation stopping ribs 17a-17c, which are provided respectively around the perimeter of the cylindrical form. Both elastic claws 16 are provided opposite each other. Each elastic claw 16 is partitioned by a roughly square bracket-shaped slit 18, has a claw part 16a on the upper side being the free end side, and is made capable of swaying elastically in the radial direction of the cylinder with the lower side as a fulcrum. The ribs 17a-17c are formed tapering to reduced height on the lower end sides, and they are formed to the shape of an attachment hole 7b which is provided in the place where the piston rod 5 is attached (in this example, the side wall 7a of the glove compartment 7), that is, to a shape corresponding to rotation stopping grooves 7c and 7d which are provided in the attachment hole 7b.

As opposed to this, the cap 2, as shown in FIG. 3 and FIGS. 5(a)-5(d), is partitioned generally by an upper wall 20 and a perimeter wall 21, and it has a shape of a partially cut-out container. On the inside, it has an inner wall 22 which is provided maintaining a small gap with the upper wall 20, and a coupling hole 23 which is provided on that inner wall 22 and couples with the encircling groove 12 of said shaft part 11.

The inner wall 22 is provided roughly in parallel with the upper wall 20 of the cap 2, and it is made capable of swaying up and down. The coupling hole 23 is constituted by an entrance 23a which has a size for accepting with an allowance the shaft part having the encircling groove 12 formed, a guide part 23b which has the width of the opening made smaller, and a main hole 23c which is provided in the center part of the inner wall 22, connected to the guide part 23b and has a hole diameter larger than the width of the opening of the guide part 23b.

Incidentally, the damper 3 is one that has a cylinder 4 and a piston rod 5. In this example, it is the air damper shown in FIGS. 2(a)-2(c), and it operates so as to open gently with damping action when the glove compartment 7 is rotated toward the open direction by its own weight from the closed position, and to close lightly without giving resistance force when the glove compartment 7 is rotated toward the closed direction from the open position. The structure, for example, is the same as that in Japanese Patent Application No. 2004-207078. That is, the cylinder 4 has an arm part 4a which is placed projecting on the outer perimeter wall of a cylindrical shape having a bottom, and an attachment hole or shaft hole 4b which is provided on the front end of that arm part 4a. The piston rod 5 is received inside the cylinder 4 to move back and forth freely in the axial direction, and also it is placed projecting outward running through a lid which closes the opening of the cylinder 4. This piston rod 5 is formed as a roughly disk-shaped piston 6 on the end that is always positioned inside the cylinder 4, and it has a shaft hole 5a on the end that projects out of the cylinder 4. The piston 6 is capable of partitioning the inside of the cylinder 4 into two air chambers C1 and C2, and it has a circumferential groove 6a which is formed on the outer perimeter of the disk shape, an O-ring 6b which is fitted into the circumferential groove 6a, plural axial grooves 6c, and an orifice not illustrated which is punched through left to right.

Also, when the piston rod 5 is pulled toward the projecting direction, that is, toward the arrow direction in FIG. 2(c), the flow of air from the air chamber C1 to the air chamber C2 is performed by way of said orifice, whereby air damping is exhibited. When the piston rod 5 is pushed in the retreating direction, that is, in the direction opposite the arrow direction in FIG. 2(c), the O-ring 6b which slide-contacts with the inner perimeter surface of the cylinder moves toward the side of the piston rod 5 inside the circumferential groove 6a, whereby the two air chambers C1 and C2 become in a communicating state by way of the axial groove 6c, and the resistance of the air flowing between the two air chambers C1 and C2 is reduced and the damping force is cancelled.

In the coupling operation of the above-described embodiment, the cylinder 4 is coupled to be capable of rotation on the support body 8a on the side of the instrument panel 8 by means of a screw or shaft member, or the like, just as in the past, which is run through the shaft hole 4b, and the piston rod 5 is coupled to be capable of rotation in the attachment hole 7b provided on the side wall 7a of the glove compartment 7 (see FIGS. 1(a) and 1(b)) by means of the above-described coupling device of the present invention as well as the shaft hole 5a. In this case, the cylinder 4 is placed inside the glove compartment 7, and the piston rod 5 becomes observable in the state when the glove compartment 7 was switched to the open position.

The coupling device of the present invention also may be used when the cylinder 4 is attached to the support body 8a on the side of the instrument panel 8. In that case, the shaft hole 4b is formed to the same shape as the shaft hole 5a, and the attachment hole 8b of the support body 8a is formed to the same shape as the attachment hole 7b. Also, the shaft hole 5a, as shown in FIGS. 2(a)-2(c) and FIGS. 6(a)-6(b), has a cut-out part 5b with part of an arc cut out for allowing the contact projection 13 to slip by. That cut-out part 5b enables restriction of the angle of rotation of the piston rod 5 to a range of rotation from when the contact projection 13 contacts with one end surface of the cut-out part 5b until it contacts with the other end surface of the cut-out part 5b. Such cut-out part 5b, as is typically shown in FIGS. 1(a)-1(b), may be formed as a step-shaped cut-out part for allowing the contact projection 13 to slip by on the lower surface side of a ring-forming part, having formed the shaft hole 5a into a complete ring shape.

Also, the procedure of the coupling operation can be selected between a method in which, as shown in FIG. 1(a), the clip 1 is coupled to the shaft hole 5a of the piston rod 5 by means of the shaft part 11 and the clip 1, and then it is locked to the attachment hole 7b of the glove compartment 7 by means of the locking leg 15, and a method in which the clip 1 is locked to the attachment hole 7b of the glove compartment 7 by means of the locking leg 15, and then it is coupled to the shaft hole 5a of the piston rod 5 by means of the shaft part 11 and the cap 2. In the operation of coupling the shaft part 11 and the cap 2, it is prevented from slipping out by the cap 2 in a state having the shaft part 11 inserted through the shaft hole 5a. That is, when the cap 2 is pushed in toward the side of the shaft part 11 with the entrance 23a being made to face opposite the shaft part on which the encircling groove 12 is formed, wherein the shaft part projects out from the shaft hole 5a, the shaft part on which the encircling groove 12 is formed moves in the guide part 23b with accompanying swaying of the inner wall 22, and finally it couples with the main hole 23c.

In this coupled state, the hole edge forming the main hole 23c is coupled into the encircling groove 12, and also, because the width of the opening of the guide part 23b is smaller than the main hole 23c, it is not easily released. Also, as for the clip 1, when the locking leg 15 is pushed into the attachment hole 7b from a state in which the ribs 17a-17c of the locking leg 15 are made to correspond to the grooves 7c and 7d of the attachment hole 7b, the elastic claws 16 pass through the attachment hole 7b while contracting in diameter and return to the original state when completely passing through, and the claw parts 16a are coupled to the lower hole edge of the attachment hole 7b, whereby it is locked to be incapable of rotation.

During operation, by interposing the damper 3 between the glove compartment 7 and the support body 8a on the side of the instrument panel 8 as above, when the glove compartment 7 in FIG. 7 is rotated toward the open direction, the flow of air from the air chamber C1 to the air chamber C2 is performed by way of said orifice, whereby air damping force can be applied. When the glove compartment 7 in FIG. 7 is rotated toward the closed direction, the O-ring 6b which slide-contacts with the inner perimeter surface of the cylinder moves toward the side of the piston rod 5 inside the circumferential groove 6a, whereby the two air chambers C1 and C2 become in a communicating state by way of the axial groove 6c, and the resistance of the air flowing between the two air chambers C1 and C2 is reduced and the damping force is not received.

Also, in this embodiment, because the coupling device of the present invention is used, even with a specification in which the damper 3 is placed inside the glove compartment 7, the external appearance characteristics can be maintained by the fact that the cap 2 functions as a cover to cover the coupling part in the in-use state. Also, because it is sufficient if only a shaft hole 5a which is commonly used as a coupling structure is formed, general usability of the damper 3 can be maintained. Moreover, the clip 1 can provide necessary and sufficient attachment strength to the attachment hole 7b by the coupling structure between the attachment hole 7b and the locking leg 15, and can easily satisfy the necessary and sufficient slip prevention strength for the shaft hole 5a by the coupling structure between the encircling groove 12 of the shaft part 11 and the coupling hole 23 of the cap 2. In addition, in the case when setting the range of rotation of the piston rod 5, the range of rotation can be restricted easily by just adding a contact projection 13 and a cut-out part 5b. Also, as for the rotation of the piston rod 5 on the shaft part 11, because the shaft part 11 is in linear contact with the inner perimeter surface of the shaft hole 5a by way of the vertical rib 14, the frictional resistance is reduced so that it can rotate well.

The above embodiment is in no way a limitation of the present invention, and as long as the coupling device for the damper of the present invention has the technical essence specified in the claims, the constitution of the piston rod type damper and that concerning the movable body, and the like, are capable of various modifications based on this.

The disclosure of Japanese Patent Application No. 2004-279023 filed on Sep. 27, 2004 is incorporated herein.

What is claimed is:

1. A coupling device for connecting a first member with a first hole to a second member with a second hole, comprising:
    a clip including a flange part, a shaft part with an encircling groove projecting from an upper surface of the flange part to be inserted into the first hole, and a locking leg projecting from a lower side of said flange part to be inserted into the second hole, said flange part projecting laterally outwardly from the shaft part and being integrally formed with the shaft part and the locking leg as one unit, and
    a cap capable of coupling with the shaft part through said encircling groove, said cap comprising a coupling part for coupling with said encircling groove on an inner side, and having a shape for covering said shaft part and first hole so as to be nearly unobservable when installed on said shaft part,
    wherein said cap has a semicircular shape, and includes an upper wall less than a full circle, a perimeter wall covering a periphery of the upper wall, and an inner wall situated under the upper wall and having a guide groove and a main hole communicating with the guide groove, said main hole having an inner diameter greater than a width of the guide groove, said perimeter wall extending downwardly from the periphery of the upper wall beyond the inner wall to cover three sides of the cap so that when the cap is assembled with the shaft part, the perimeter wall extends partly along an outer periphery of the flange.

2. A coupling device as recited in claim 1, wherein said encircling groove has a diameter greater than the width of the guide groove and less than the inner diameter of the main hole.

3. A coupling device as recited in claim 1, wherein said locking leg includes at least one elastic claw for holding the second member under the flange.

4. A coupling device as recited in claim 1, wherein said shaft part includes a contact projection at one side thereof for restricting rotation thereof.

5. A coupling device as recited in claim 1, wherein said encircling groove is dented inwardly from an outer surface of the shaft part.

6. A coupling device as recited in claim 5, wherein said locking leg includes at least one elastic claw for holding the second member under the flange, and a plurality of rotating stopping ribs extending along a longitudinal direction of the locking leg and projecting radially outwardly from an outer surface thereof, said at least one elastic claw and said rotating stopping ribs being integrally formed with the clip as one unit.

7. A combination comprising a coupling device and first and second members, said coupling device connecting the first member with a first hole to the second member with a second hole, said coupling device including:
    a clip including a flange part, a shaft part with an encircling groove projecting from an upper side of the flange part and inserted into the first hole, and a locking leg projecting from a lower side of said flange part and inserted into the second hole, and
    a cap capable of coupling with the shaft part through said encircling groove,
    wherein said first member is a rod for a damping piston rod damper used when switching a movable body to rotate between an open position and a closed position on a main body and interposed between said main body and said movable body,
    said locking leg is locked in an attachment hole as the second hole provided on said main body, and said shaft part is inserted through a shaft hole as the first hole provided on said rod so as to be held securely by said cap coupled to said encircling groove of the shaft part, and
    said rod has a cut-out part, and said shaft part includes a contact projection at one side thereof engaging the cut-out part to restrict rotation range to a prescribed angle.

* * * * *